United States Patent
Watanabe (10) Patent No.: US 10,074,845 B2
(45) Date of Patent: Sep. 11, 2018

(54) CONNECTION UNIT

(71) Applicant: TOYOTA JIDOSHA KABUSHIKI KAISHA, Toyota-shi, Aichi-ken (JP)

(72) Inventor: Hirotaka Watanabe, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/113,226

(22) PCT Filed: Jan. 19, 2015

(86) PCT No.: PCT/IB2015/000039
§ 371 (c)(1),
(2) Date: Jul. 21, 2016

(87) PCT Pub. No.: WO2015/110891
PCT Pub. Date: Jul. 30, 2015

(65) Prior Publication Data
US 2017/0012268 A1   Jan. 12, 2017

(30) Foreign Application Priority Data

Jan. 22, 2014   (JP) ................. 2014-009405

(51) Int. Cl.
*H01M 2/20* (2006.01)
*H01M 2/10* (2006.01)
(Continued)

(52) U.S. Cl.
CPC ......... *H01M 2/206* (2013.01); *H01M 2/1077* (2013.01); *H01M 2/1241* (2013.01);
(Continued)

(58) Field of Classification Search
None
See application file for complete search history.

(56) References Cited

U.S. PATENT DOCUMENTS

2010/0052692 A1* 3/2010 Yano ................... H01M 2/1083
324/427
2011/0076521 A1 3/2011 Shimizu et al.
(Continued)

FOREIGN PATENT DOCUMENTS

CN   101662054 A   3/2010
CN   103155265 A   6/2013
(Continued)

*Primary Examiner* — Wojciech Haske
(74) *Attorney, Agent, or Firm* — Sughrue Mion, PLLC (57) ABSTRACT

A connection unit of the present invention includes: a rail member extending in a direction where a plurality of storage elements is aligned; and a plurality of bus bar units each including an engagement portion movable along the rail member in the predetermined direction, and a bus bar fixed to electrode terminals of the storage elements adjacent to each other in the predetermined direction and connected to the engagement portion. The plurality of bus bar units engages with the rail member so as to be aligned in the predetermined direction, and the bus bar units adjacent to each other are provided so as to be movable independently along the predetermined direction. Entire assembly tolerance in the plurality of storage elements aligned in the predetermined direction can be absorbed (permitted) by adjusting distances between the independent bus bar units, thereby making it possible to easily assemble the plurality of bus bars.

5 Claims, 6 Drawing Sheets (51) Int. Cl.
*H01M 2/12* (2006.01)
*H01M 10/48* (2006.01)

(52) U.S. Cl.
CPC ......... *H01M 10/48* (2013.01); *H01M 10/486* (2013.01); *H01M 2220/20* (2013.01)

(56) References Cited

U.S. PATENT DOCUMENTS

| | | | | |
|---|---|---|---|---|
| 2011/0104556 | A1* | 5/2011 | Kim | H01M 2/1077 429/160 |
| 2012/0231638 | A1* | 9/2012 | Ikeda | H01M 2/1077 439/77 |
| 2013/0164595 | A1* | 6/2013 | Takase | H01M 2/206 429/120 |
| 2015/0064524 | A1* | 3/2015 | Noh | H01M 10/48 429/90 |

FOREIGN PATENT DOCUMENTS

| | | | | |
|---|---|---|---|---|
| JP | 2011-076936 A | 4/2011 | | |
| JP | 2011-091003 A | 5/2011 | | |
| JP | WO 2012046517 A1 * | 4/2012 | ............ | H01M 2/206 |
| JP | 2012-243608 A | 12/2012 | | |
| JP | 2014-010984 A | 1/2014 | | |
| JP | 2015-133223 A | 7/2015 | | |

* cited by examiner

CONNECTION UNIT

BACKGROUND OF THE INVENTION

1. Field of the Invention

The present invention relates to a connection unit configured to electrically connect a plurality of storage elements to each other.

2. Description of Related Art

A battery pack can be configured such that a plurality of single cells is aligned in a predetermined direction. At this time, the plurality of single cells is electrically connected to each other via a plurality of bus bars. Japanese Patent Application Publication No. 2012-243608 (JP 2012-243608 A) describes an integral bus bar module in which to accommodate a plurality of bus bar. The bus bar module includes bus bar accommodation portions configured to accommodate respective bus bars therein.

The single cell has tolerance in dimension in a predetermined direction. Because of this, variations occur in length of the battery pack in the predetermined direction. Along with this, a bus bar connected to the single cell may be displaced in the predetermined direction. In the bus bar module of JP 2012-243608 A, a tolerance absorption portion is provided between two bus bar accommodation portions adjacent to each other in the predetermined direction. A distance between the two bus bar accommodation portions can be adjusted by deforming the tolerance absorption portion, so that the bus bars can be connected to the single cells.

SUMMARY OF THE INVENTION

However, the bus bar module of JP 2012-243608 A has a limit in the deformation of the tolerance absorption portion. That is, there is a limit to widen the distance between the two bus bar accommodation portions. Because of this, the distance between the two bus bar accommodation portions may not be widened to a position at which the bus bars can be connected to the single cells.

In view of this, an object of the present invention is to provide a connection unit which allows variations in overall length of a plurality of storage elements in a predetermined direction at the time when the plurality of storage elements aligned in the predetermined direction is electrically connected to each other, and which allows easy assembly thereof.

A connection unit of a first aspect of the present invention is a connection unit configured to electrically connect a plurality of storage elements aligned in a predetermined direction. The connection unit includes: a rail member extending in the predetermined direction; and a plurality of bus bar units each including an engagement portion configured to engage with the rail member so as to be movable along the rail member in the predetermined direction, and a bus bar fixed to electrode terminals of the storage elements adjacent to each other in the predetermined direction and connected to the engagement portion. The plurality of bus bar units engages with the rail member so as to be aligned in the predetermined direction, and the bus bar units adjacent to each other are provided so as to be movable independently along the predetermined direction.

In the first aspect of the present invention, the plurality of bus bar units is individually provided as a unit along the rail member, so that each of the bus bar unit can move independently in a longitudinal direction of the member (a direction where respective electrode terminals of the storage elements adjacent to each other are aligned). Accordingly, it is possible to adjust a distance between the bus bar units adjacent to each other according to tolerance of the storage elements in the predetermined direction without depending on other bus bar units. As a result, entire assembly tolerance in the plurality of storage elements aligned in the predetermined direction can be absorbed (permitted) by adjusting respective distances between the bus bar units independent from each other, thereby making it possible to easily assemble the plurality of bus bars.

Further, the rail member can be configured to include a slit allowing the engagement portion to move along the predetermined direction; an engagement rail configured to engage with the engagement portion; an outlet portion provided at a position corresponding to an exhaust valve configured to exhaust gas generated in the storage element to its outside, the outlet portion extending in the predetermined direction so as to form a gas discharge path provided generally in parallel with the engagement rail; and a mounting portion extending along the outlet portion and configured such that a temperature sensor configured to detect a temperature of the storage elements is provided therein. At this time, the engagement rail, the outlet portion, and the mounting portion can be configured to, be formed integrally with each other so as to be aligned in a direction generally perpendicular to the predetermined direction. Since the gas outlet portion and the mounting portion for a temperature sensor are integrated with the rail member, it is possible to reduce the number of components. In addition, it is not necessary to provide respective components (spaces) individually, so that assembly performance is improved. Further, the temperature sensor is provided in the mounting portion extending along the outlet portion (the gas discharge path), thereby making it possible to accurately detect the temperature of the storage elements at the time of gas generation and to determine a mounting position of the temperature sensor to a given position along the predetermined direction. This improves a degree of freedom of the assembly of the temperature sensor.

Further, each of the bus bar units can further include a voltage detection line connected to the bus bar and configured to detect a voltage of the storage element. Further, the rail member can include a detection line placement portion extending along a direction where the plurality of bus bar units is aligned. The voltage detection line extending from the bus bar unit placed in the rail member via the engagement portion can be configured to be extended in the detection line placement portion generally in parallel with the predetermined direction. Accordingly, with respect to the plurality of bus bar units aligned along the rail member, the voltage detection lines extending from the bus bars are gathered in the detection line placement portion extending along the direction where the plurality of bus bar units is aligned. This makes it possible to achieve efficiency of a placement space for the voltage detection lines.

Further, the engagement portion can be made of thermo plastic resin, and at least part of the voltage detection line including a connection region with the bus bar can be configured to be covered with the thermo plastic resin. The bus bar unit can be configured such that the bus bar and the voltage detection line are formed integrally with each other. Since the bus bar and the voltage detection line are provided integrally with the bus bar unit, assembly tolerance of each component in the bus bar unit can be reduced. In addition, it is not necessary to attach the voltage detection line to the bus bar individually, thereby making it possible to improve assembly performance. Further, since at least part of the voltage detection line including the connection region with the bus bar is covered with the thermo plastic resin, it is possible to restrain corrosion of the voltage detection line including the connection region with the bus bar.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment of the present invention.

Embodiment 1

Figure 1:
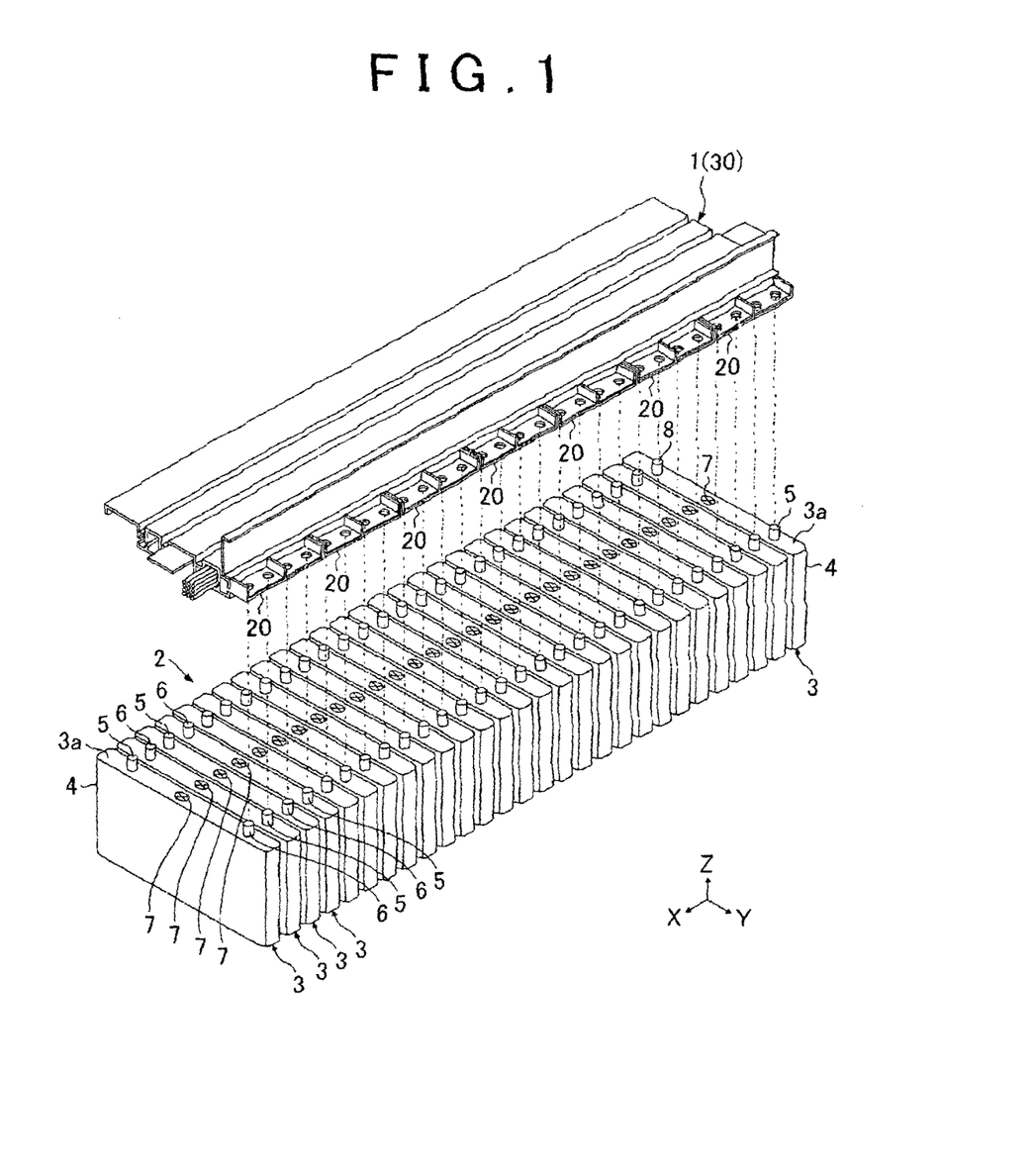
FIG. 1 is a schematic perspective view of a connection unit and a battery pack in Embodiment 1.

FIGS. 1 to 8 are views each illustrating Embodiment 1 of the present invention. FIG. 1 is a schematic perspective view of a connection unit and a battery pack. In FIG. 1 and so on, an X-axis, a Y-axis, and a Z-axis are axes perpendicular to each other. A relationship between the X-axis, the Y-axis, and the Z-axis is the same in the other drawings. In the present embodiment an axis corresponding to a vertical direction is regarded as the Z-axis.

As illustrated in FIG. 1, a connection unit 1 of the present embodiment is a connection member configured to electrically connect a plurality of single cells 3 aligned in an X-direction. Here, a battery pack 2 is constituted by the plurality of single cells 3.

The single cell (corresponding to a storage element) 3 includes a battery outer case 4 in which a power generation element is accommodated. The single cell 3 is a so-called square-shaped battery, and the battery outer case 4 is formed in a rectangular solid shape. The battery outer case 4 can be made of metal, for example.

A top face 3a of the single cell 3 (the battery outer case 4) is provided with a positive terminal 5 and a negative terminal 6 connected to the power generation element accommodated in the single cell 3. The battery outer case 4 can be constituted by a case main body and a cover forming an accommodation space for the power generation element, for example. The top face 3a corresponds to a cover closing, from above, an opening of the case main body into which the power generation element is assembled. The cover and the case main body can be fixed by welding, for example, and an inside of the battery outer case 4 is in a sealing state.

The top face 3a is provided with an exhaust valve 7 configured to exhaust gas outside the battery outer case 4 when the gas is generated inside the battery outer case 4. The exhaust valve 7 is a breakage valve constituted by a groove formed on the top face 3a. When an internal pressure of the battery outer case 4 increases due to gas generation, the exhaust valve 7 is broken, and hereby, the gas inside the battery outer case 4 can be exhausted outside the battery outer case 4. Further, the top face 3a can be provided with an injection opening (not shown). The injection opening is used to inject an electrolyte into the battery outer case 4, and is closed by an injection stopper.

The power generation element includes a positive element, a negative element, and a separator placed between the positive element and the negative element. The positive element connected to the positive terminal 5 includes a current collector, and a positive-electrode active material layer formed on a surface of the current collector. The negative element connected to the negative terminal 6 includes a current collector, and a negative-electrode active material layer formed on a surface of the current collector. The electrolyte soaks into the separator, the positive-electrode active material layer, and the negative-electrode active material layer. Note that, instead of the electrolyte, a solid electrolyte can be used.

As illustrated in FIG. 1, the positive terminal 5 and the negative terminal 6 are provided on the top face 3a so as to be distanced from each other in a Y-direction. The exhaust valve 7 is provided between the positive terminal 5 and the negative terminal 6.

Note that the plurality of single cells 3 aligned in the X-direction can be configured such that a space is provided between two adjacent single cells 3. For example, a separator (not shown) may be placed so that a space for circulating air to adjust a temperature of the single cells 3 can be formed between the two adjacent single cells 3. The separator can also function as an insulating member for electrically insulating the two adjacent single cells 3.

Further, an arrangement structure of the plurality of single cells 3 can be determined appropriately. For example, the single cells 3 can be also placed so as to be close to each other without forming, between any two adjacent single cells 3, a space for circulating air to adjust the temperature of the single cells 3.

The battery pack 2 of the present embodiment can be provided in a vehicle, so as to be used as a power source for causing the vehicle to run. The vehicle may be a hybrid vehicle or an electric vehicle. The hybrid vehicle is a vehicle including another power source such as a fuel cell or an internal combustion engine as a power source for causing the vehicle to run, in addition to the battery pack 2. The electric vehicle is a vehicle including only the battery pack 2 as a power source of the vehicle. One or more battery packs 2 can be provided in the vehicle. Further, as the single cell 3, a secondary battery such as a nickel metal hydride battery or a lithium-ion battery can be used. Further, instead of the secondary battery, an electric double layer capacitor can be used.

Next will be described the connection unit 1 of the present embodiment in detail. The connection unit 1 is attached to a top face (the top faces 3a of the single cells 3) of the battery pack 2 in a Z-direction. Note that those bottom faces of the single cells 3 which are placed on an opposite side to the top faces 3a of the single cells 3 in the Z-direction serve as a lower face of the battery pack 2.

The connection unit 1 includes a plurality of bus bar units 20 aligned in the X-direction, and a rail member 30 extending in the X-direction.

Figure 2:
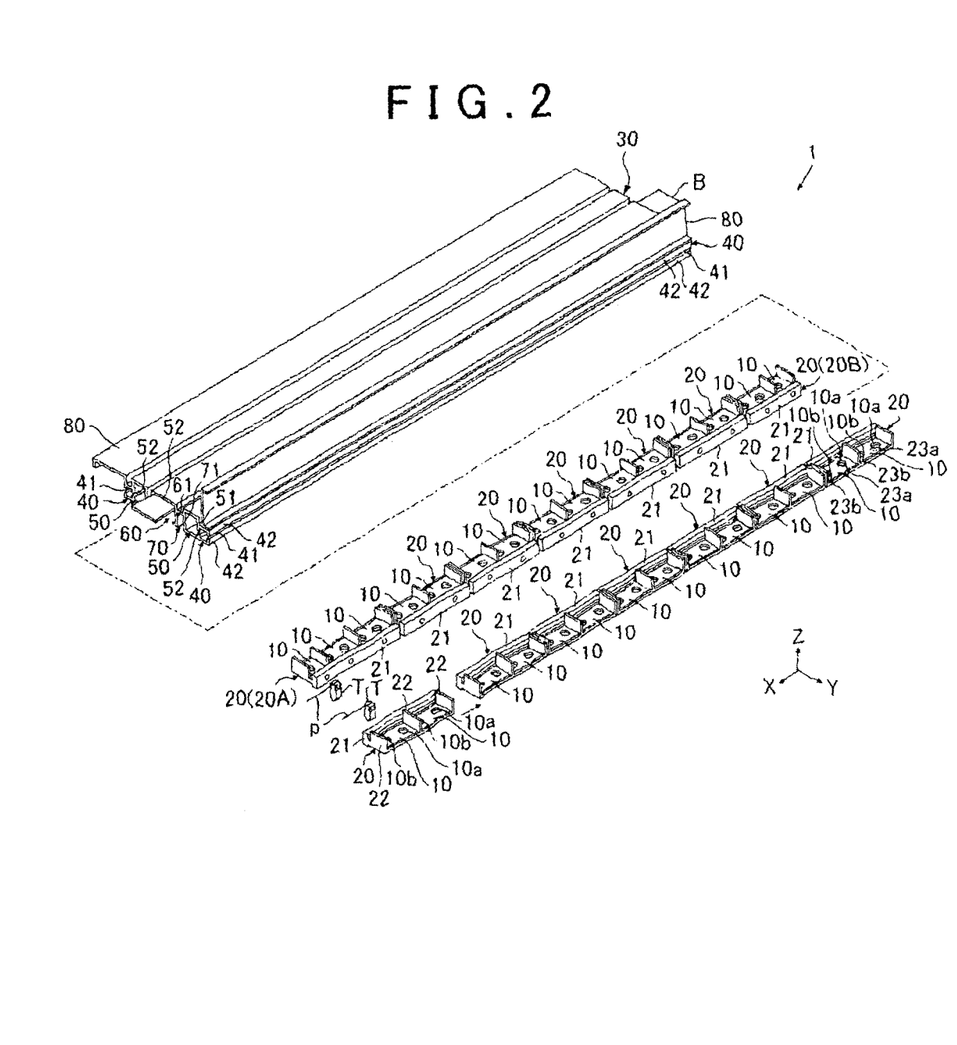
FIG. 2 is a schematic perspective view illustrating a configuration of the connection unit in Embodiment 1.

FIG. 2 is a schematic perspective view illustrating a configuration of the connection unit 1 in the present embodiment.

The rail member 30 includes two engagement rails 40. The two engagement rails 40 are distanced from each other in the Y-direction, and are provided in a symmetrical manner based on an X-Z plane placed in an intermediate part between the two engagement rails 40. The connection unit 1 has a predetermined width in the Y-direction according to a distance between the two engagement rails 40.

The engagement rail 40 engages with the after-mentioned engagement portion 21 of the bus bar unit 20, so as to move the bus bar unit 20 in the X-direction. The engagement rail 40 includes a slit 41 provided on an end surface thereof in the Y-direction so as to extend in the X-direction. The engagement rail 40 is formed in a hollow shape, and the engagement portion 21 of the bus bar unit 20 is placed inside the engagement rail 40. Here, a base end portion of the engagement portion 21 penetrates through the slit 41. By moving the engagement portion 21 along the slit 41, the bus bar unit 20 can be moved in the X-direction.

An inside of the engagement rail 40 is formed in a hollow shape by respective wall portion corresponding to a top face and a lower face of the engagement portion 21, and a Y-direction side surface on which the slit 41 is formed. The slit 41 can be formed such that part of a wall portion 42 corresponding to the Y-direction side surface is opened. The wall portion 42 is provided so that at least part thereof extends toward upper and lower sides of the slit 41 in the Z-direction so that an inner surface making contact with the engagement portion 21 in the Y-direction is formed.

In the connection unit 1 thus configured, the plurality of bus bar units 20 is placed along a longitudinal direction of the rail member 30 (each of the engagement rails 40). As illustrated in FIG. 2, the engagement portion 21 is inserted inside the engagement rail 40 from an X-direction end part of the engagement rail 40, so that each of the plurality of bus bar units 20 can be attached to the rail member 30. Hereby, each of the bus bar units 20 can be moved independently along the X-direction.

Figure 5:
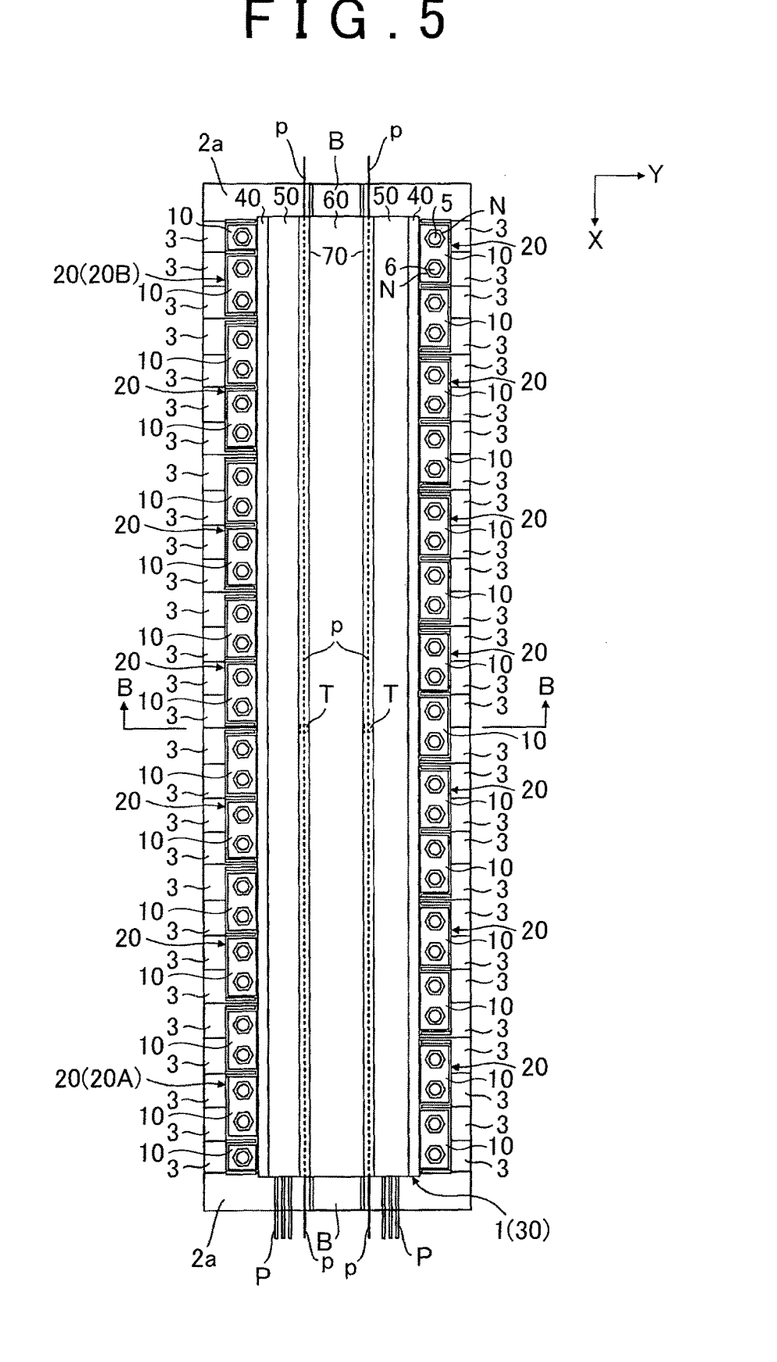
FIG. 5 is a top view of the battery pack to which the connection unit is connected, in Embodiment 1.
Figure 6:
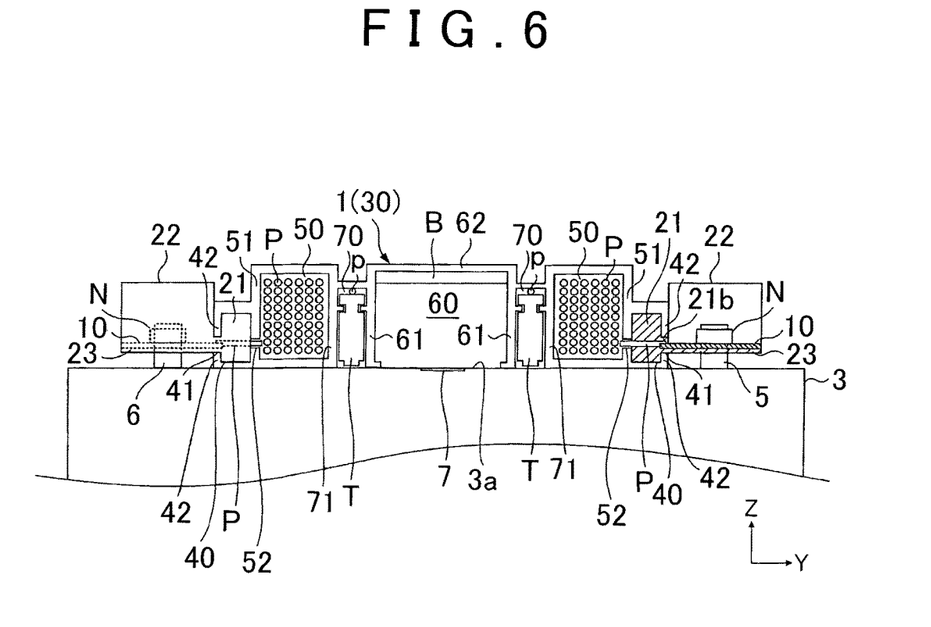
FIG. 6 is a sectional view taken along a line B-B in FIG. 5 in Embodiment 1.

A cover member 80 is attached to an external surface of the engagement rail 40. The cover member 80 can rotate along an axis extending in the X-direction as a rotation axis. Here, the cover member 80 rotates between a position where the cover member 80 covers an upper side of the plurality of bus bar units 20 attached to the engagement rail 40, and a position where the cover member 80 moves away from the upper side of the plurality of bus bar units 20. Note that the cover member 80 can be formed as a member removal from the rail member 30. In FIGS. 5 and 6, the cover member 80 is not illustrated.

Figure 3:
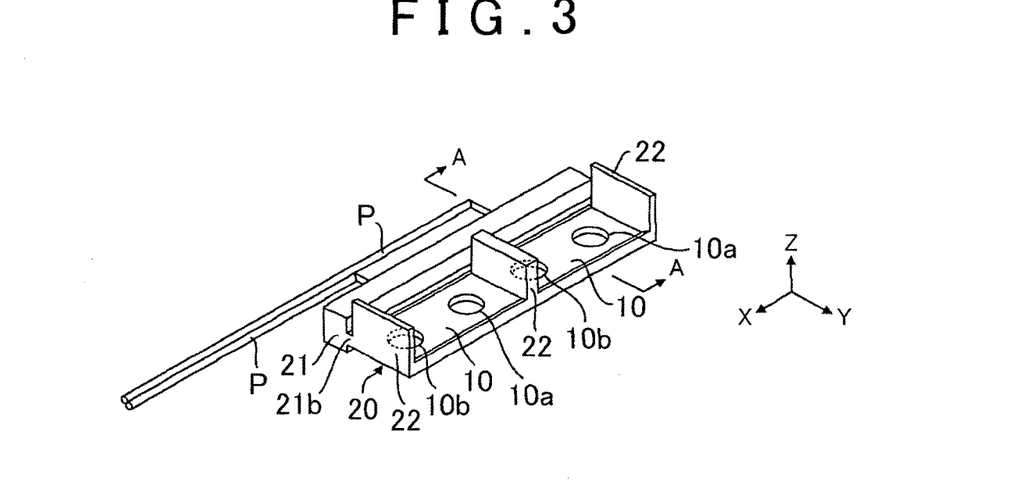
FIG. 3 is a schematic perspective view illustrating a bus bar unit in Embodiment 1.
Figure 4:
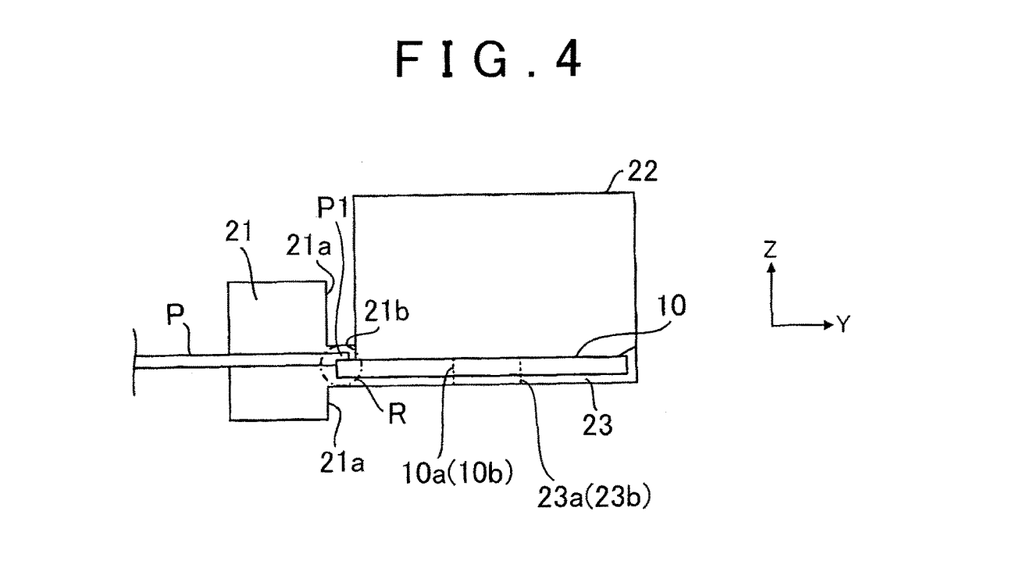
FIG. 4 is an enlarged sectional view taken along a line A-A in FIG. 3 in Embodiment 1.

FIG. 3 is a schematic perspective view illustrating a configuration of the bus bar unit 20. FIG. 4 is an enlarged sectional view taken along a line A-A in FIG. 3. As illustrated in FIG. 3, the bus bar unit 20 includes the engagement portion 21 and bus bars 10. The engagement portion 21 is a runner portion configured to engage with the rail member 30, so as to be movable along the rail member 30 in the X-direction (corresponding to a predetermined direction). The bus bar 10 is placed so as to project from the engagement portion 21 in the Y-direction, and electrically connects a positive terminal 5 of one of two adjacent single cells 3 in the X-direction to a negative terminal 6 of the other one thereof. The bus bar 10 can be made of a conductive material, such as a metal material.

The bus bar 10 has two openings 10a, 10b distanced from each other in the X-direction. The two openings 10a, 10b are formed according to a distance between the positive terminal 5 and the negative terminal 6 of the two adjacent single cells 3 in the X-direction. The openings 10a, 10b are formed to have a magnitude that allows the positive terminal 5 or the negative terminal 6 to pass therethrough.

In the example of FIG. 3, two bus bars 10 are provided in one bus bar unit 20. The two bus bars 10 are aligned in the X-direction with their longitudinal direction being along a direction where the openings 10a, 10b are aligned, and are partitioned by a partition portion 22. The partition portion 22 is a partition wall projecting in the Z-direction. Further, both ends of the bus bar unit 20 in the X-direction are provided with partition portions 22. By providing the partition portion 22 in X-direction end parts of the bus bar unit 20, it is possible to restrain short circuit with a plurality of adjacent bus bar units 20 (bus bars 10) aligned in the X-direction in the rail member 30.

The bus bar unit 20 of the present embodiment can be formed by hot melt molding by use of thermo plastic resin. Accordingly, the engagement portion 21 can be made of the thermo plastic resin, and the bus bar unit 20 including the bus bars 10 connected to the engagement portion 21 can be formed by the hot melt molding.

A sectional shape of the engagement portion 21 along a Y-Z plane can be a shape according to a hollow sectional shape of the engagement rail 40. At this time, the engagement portion 21 may have a shape engaging with a hollow internal portion of the engagement rail 40 without any space, or may have any shape in which the engagement portion 21 cannot be removed from the engagement rail 40 through the slit 41 at the time of movement of the bus bar unit 20 along the X-direction.

For example, the engagement portion 21 can engage with the rail member 30 such that the top face, the lower face, and the Y-direction side surface of the engagement portion 21 make contact with a hollow inner surface of the engagement rail 40. When the engagement portion 21 is formed such that its height in the Z-direction is higher than an opening width of the slit 41 in the Z-direction, that inner surface of the wall portion 42 on which the slit 41 is formed makes contact with that side surface 21a of the engagement portion 21 which faces a bus-bar-10 side, so that the bus bar unit 20 is attached to the rail member 30 in a movable manner in the X-direction while its movement in the Y-direction is prevented.

The engagement portion 21 includes the base end portion 21b placed between the engagement portion 21 and the bus bar 10. The base end portion 21b is formed in a shape projecting from the side surface 21a so as to be placed outside the engagement rail 40 through the opening of the slit 41. The base end portion 21b is formed to have the same thickness as the opening width of the slit 41 in the Z-direction or a thickness smaller than the opening width of the slit 41. A longitudinal-direction end part of the bus bar 10 is connected to base end portion 21b.

In the bus bar unit 20, the bus bar 10 is not entirely covered with the thermo plastic resin, and a peripheral end part of the bus bar 10 is fixed by thermo plastic resin. A bus bar holding portion 23 is provided on a lower side of the bus bar 10 in the Z-direction. The bus bar holding portion 23 can be formed by extending part of the base end portion 21b toward a lower face of the bus bar 10. The engagement portion 21 and the bus bar holding portion 23 are formed integrally with each other via the base end portion 21b.

The bus bar holding portion 23 is provided with openings 23a, 23b corresponding to the openings 10a, 10b of the bus bar 10, and the openings 23a, 23b are formed so as to be distanced from each other in the X-direction. In the Z-direction, the positive terminal 5 or the negative terminal 6 of the single cell 3 is inserted into the opening 23a, 23b of the bus bar holding portion 23 and the opening 10a, 10b of the bus bar 10, so as to be exposed to the top face of the bus bar 10.

Further, a voltage detection line P configured to detect a voltage of the single cell 3 can be provided in the bus bar 10. An end part P1 of the voltage detection line P can be electrically connected to the bus bar 10 by welding. The end part P1 of the voltage detection line P functions as a voltage detection terminal in a connection region R with the bus bar 10. Note that the voltage detection line P can be configured to include a voltage detection terminal provided separately from the end part P1. In this case, the voltage detection terminal connected to the end part P1 of the voltage detection line P is connected by welding or the like in the connection region R with the bus bar 10, so that the voltage detection line P is electrically connected to the bus bar 10. The voltage detection line P is connected to a voltage sensor (not shown).

The bus bar unit 20 of the present embodiment is made of the thermo plastic resin by hot melt molding, so that at least part of the voltage detection line P including the connection region R with the bus bar 10 can be configured to be covered with the thermo plastic resin. That is, the bus bar unit 20 is formed integrally with the bus bar 10 and the voltage detection line P connected to the bus bar 10.

As illustrated in an enlarged sectional view of FIG. 4, a Y-direction end part of the bus bar 10 is connected to the base end portion 21b of the engagement portion 21, and the voltage detection line P is connected to the bus bar 10. The voltage detection line P is covered with the thermo plastic resin in a region (the base end portion 21b) from the connection region R with the bus bar 10 to the engagement portion 21, and is not exposed outside. The voltage detection line P placed so as to be directed from the bus bar 10 toward the engagement portion 21 is exposed outside from that Y-direction end surface of the engagement portion 21 which is on a side opposite to the base end portion 21b.

Note that the bus bar unit 20 may be configured so as not to include the bus bar holding portion 23. For example, in the example of FIG. 3, the bus bar 10 can be configured to be held by the base end portion 21b of the engagement portion 21 in a cantilever manner.

Further, the bus bar unit 20 may be configured to include one bus bar 10, or can be configured to include three or more bus bars 10. Further, a bus bar unit combined, with a bus bar having one opening can be formed like bus bar units 20A, 20B of FIG. 2, according to a combination of the positive and negative electrodes of the single cells 3 of the battery pack 2. Note that it is preferable that the number of bus bars 10 included in the bus bar unit 20 be set to a number that can permit variations in a distance between electrode terminals aligned in the X-direction.

As described above, the voltage detection line P extends from each of the bus bar units 20. In view of this; the rail member 30 includes a detection line placement portion 50 configured to accommodate the voltage detection lines P therein.

The detection line placement portion 50 is provided at a position adjacent to each of the engagement rails 40 in the Y-direction. More specifically, the detection line placement portion 50 is provided on a side of the engagement rail 40 which side is opposite to the slit 41. The hollow internal portion of the engagement rail 40 and the detection line placement portion 50 are partitioned by a wall portion 51, but partially communicate with each other through a communication portion 52 formed in the wall portion 51. Accordingly, in a state where the engagement portion 21 is placed in the engagement rail 40, the voltage detection line P can be placed in the detection line placement portion 50 through the communication portion 52.

In a state where the bus bar units 20 are placed in the rail member 30 through the engagement portions 21, the voltage detection lines P extending from the bus bar units 20 are accommodated in the detection line placement portion 50 and are generally extended in parallel with the X-direction. An X-direction end part of the detection line placement portion 50 is opened, so that the voltage detection lines P placed collectively in the detection line placement portion 50 are wired outside the connection unit 1 from the X-direction end part.

Note that, in the present embodiment, the engagement rail 40 and the detection line placement portion 50 are partitioned by the wall portion 51, but the present embodiment is not limited to this. Without providing the wall portion 51, a space communicating with the hollow internal portion of the engagement rail 40 in the Y-direction can be formed as the detection line placement portion 50. That is, the detection line placement portion 50 of the present embodiment can be provided integrally with the hollow internal portion of the engagement rail 40 (as a part of the hollow internal portion), or can be provided as a space partitioned by the wall portion 51.

Further, the rail member 30 of the present embodiment can be provided with an outlet portion 60 provided at a position corresponding to the exhaust valves 7 for exhausting gas generated inside the single cells 3 to an outside of the battery outer case 4, the outlet portion 60 extending in the X-direction so as to form a gas discharge path provided generally in parallel with the engagement rail 40; and a mounting portion 70 extending along the outlet portion 60 and configured such that a temperature sensor T for detecting a temperature of the single cells 3 is provided therein.

The outlet portion 60 forms a path through which gas exhausted from those exhaust valves 7 of the plurality of single cells 3 which are aligned in the X-direction is discharged outside the battery pack 2. Outlet ducts are connected to X-direction end parts of the outlet portion 60. The gas discharged outside the battery outer case 4 from the exhaust valves 7 of the single cells 3 moves through the outlet portion 60 in the X-direction, and can be discharged outside the vehicle via the outlet ducts (not shown).

The mounting portion 70 for the temperature sensor T is adjacently provided on either side of the outlet portion 60 in the Y-direction, so as to be placed between the outlet portion 60 and the engagement rail 40 (the detection line placement portion 50). The mounting portion 70 extends along the outlet portion 60 in the X-direction.

The outlet portion 60 is a space formed by two wall portions 61 extending downward in the Z-direction toward the top faces 3a, and a wall portion 62 covering an upper side between the wall portions 61. End parts of the wall portions 61 make contact with the top faces 3a, so that an opening between the wall portions 61 on a lower side in the Z-direction is closed by the top faces 3a. Hereby, a sealed discharge path is formed.

Each of the mounting portions 70 is partitioned from the outlet portion 60 by the wall portion 61. Further, each of the mounting portions 70 is partitioned from the detection line placement portion 50 by a wall portion 71. A lower side of the mounting portion 70 in the Z-direction is opened, so that the temperature sensor T and the top faces 3a of the single cells 3 are not partitioned by any wall portion or the like.

The rail member 30, the engagement rails 40, the detection line placement portions 50, the outlet portion 60, and the mounting portions 70 of the present embodiment extend in the X-direction, and are aligned along a direction generally parallel to the Y-direction (a direction generally perpendicular to the X-direction) so as to be formed integrally with each other.

FIG. 5 is a top view of the battery pack 2 to which the connection unit 1 is attached. The connection unit 1 of the present embodiment is configured such that a plurality of bus bar units 20 can be attached thereto according to the number of electrode terminals of the battery pack 2. The connection unit 1 in a state where the plurality of bus bar units 20 is attached thereto is attached to the battery pack 2 from its upper side in, the Z-direction.

At this time, the bus bar unit 20 can be moved along the engagement rail 40 according to positions of the positive terminal 5 and the negative terminal 6 of the single cells 3 adjacent to each other in the X-direction in the battery pack 2. Thus, each of the bus bar units 20 is positioned by being moved in the X-direction, and the positive terminal 5 and the negative terminal 6 are passed through the openings 10a, 10b of each of the bus bars 10.

The positive terminal 5 and the negative terminal 6 passed through the openings 10a, 10b of the bus bar 10 are fixed to the bus bar 10 by a fastening member N such, as a nut. For example, a thread groove for the nut can be formed on a peripheral surface of an electrode terminal. The bus bar 10 is electrically connected to the positive, terminal 5 and the negative terminal 6 through the peripheral surfaces of the positive terminal 5 and the negative terminal 6 and/or the nuts.

Further, as illustrated in FIG. 5, in a state where the connection unit 1 is attached, the voltage detection lines P extending from the bus bar units 20 (the bus bars 10) are accommodated in the detection line placement portion 50, and extended along the X-direction in a state where the voltage detection lines P are gathered within the rail member 30.

Further, the temperature sensor T is provided in the mounting portion 70 together with a detection line p connected to the temperature sensor T. For example, the temperature sensor T to which the detection line p is attached is inserted from an X-direction end part of the mounting portion 70, and the temperature sensor T and the detection line p are moved in the X-direction with the detection line p being taken as an extruding member. This makes it possible to attach the temperature sensor T to a given position in the mounting portion 70 extending in the X-direction. Alternatively, the temperature sensor T can be attached to a given position in the mounting portion 70 in such a manner that a stick-shaped extruding member, which is different from the detection line p, is used to push, in the X-direction, the temperature sensor T inserted in the mounting portion 70 from the X-direction end part. Note that a top face of the mounting portion 70 is covered with a wall portion of the rail member 30. In view of this, in order to visually check the mounting position of the temperature sensor T, a visual observation window (an opening) may be provided on a top wall portion.

Further, a restraint member B connected to paired end plates 2a constituting the battery pack 2 can be placed in the outlet portion 60. The paired end plates 2a are placed at opposite ends of the battery pack 2 in the X-direction, so as to sandwich the plurality of single cells 3 constituting the battery pack 2. The paired end plates 2a are used to give a restraint force to the plurality of single cells 3. The restraint force is a force to sandwich the single cells 3 in the X-direction. By giving the restraint force to the single cells 3, expansion of the single cells 3 can be restrained, thereby making it possible to restrain deterioration of input-output characteristics of the single cells 3.

Both ends of the band-shaped restraint member B extending in the X-direction are connected to the paired end plates 2a. Hereby, the paired end plates 2a can give a restraint force to the plurality of single cells 3. The restraint member B can be placed on a top face and a lower face of the battery pack 2. The number of restraint members B can be set appropriately, provided that both ends of the band-shaped restraint members B are connected to the paired end plates 2a.

FIG. 6 is a sectional view taken along a line B-B (a Y-Z section) in FIG. 5. As illustrated in FIG. 6, the connection unit 1 attached to the battery pack 2 is placed so that the rail member 30 covers the top face 3a of the single cell 3. Two engagement rails 40 are placed relative to those positive terminal 5 and negative terminal 6 of the single cell 3 which are distanced in the Y-direction, and the detection line placement portions 50 and the mounting portions 70 for the temperature sensors T are placed between the engagement rails 40. The outlet portion 60 as the gas discharge path is placed at a position corresponding to the exhaust valve 7 between the two engagement rails 40.

In other words, in a region between the positive terminal 5 and the negative terminal 6 in the Y-direction, the mounting portions 70 for the temperature sensors T are formed on both side of the outlet portion 60 corresponding to the exhaust valve 7, and the detection line placement portions 50 for the voltage detection lines P and the engagement rails 40 engaging with the bus bar units 20 are formed next to the mounting portions 70. Further, the plurality of bus bar units 20 are placed outside the engagement rails 40 in the Y-direction so as to be movable independently in the X-direction.

The connection unit 1 of the present embodiment is configured such that the plurality of bus bar units 20 is each individually provided as a unit along the rail member 30, so that each of the bus bar unit 20 can move independently in a longitudinal direction of the rail member 30 (a direction where the positive terminal 5 and the negative terminal 6 of adjacent single cells 3 are aligned). Accordingly, it is possible to adjust a distance between the bus bar units 20 adjacent to each other according to tolerance of the single cells 3 in the X-direction without depending on the other bus bar units 20. Accordingly, entire assembly tolerance (variations) in the plurality of single cells 3 aligned in the X-direction can be absorbed (permitted) by adjusting respective distances between the independent bus bar units 20, thereby making it possible to easily assemble the plurality of bus bars 10.

Further, the gas outlet portion 60 and the mounting portion 70 for the temperature sensor T are integrated with the rail member 30, thereby making it possible to reduce the number of components. In addition, it is not necessary to individually provide the outlet portion 60 and the mounting portion 70 with respect to the battery pack 2, thereby making it possible to improve assembly performance. Further, the temperature sensor T is provided in the mounting portion 70 extending along the outlet portion 60 (the gas discharge path), thereby making it possible to accurately detect the temperature of the single cells 3 at the time of gas generation and to determine a mounting position of the temperature sensor T to a given position along the X-direction. This improves a degree of freedom of the assembly of the temperature sensor T. Further, it is possible to easily attach a plurality of temperature sensors T to a plurality of positions.

Further, the bus bar unit 20 can be configured to integrally include the voltage detection line P connected to the bus bar 10, and the rail member 30 includes the detection line placement portion 50 extending along a direction where the plurality of bus bar units 20 is aligned. Accordingly, with respect to the plurality of bus bar units 20 aligned along the rail member 30, the voltage detection lines P extending from the bus bars 10 are gathered in the detection line placement portion 50 extending along the direction where the plurality of bus bar units 20 is aligned. This makes it possible to achieve efficiency of a placement space for the voltage detection lines P.

Further, in the present embodiment, since the bus bar 10 and the voltage detection line P are formed integrally with each other to constitute the bus bar unit 20, assembly tolerance of each component in the bus bar unit 20 can be reduced. In addition, it is not necessary to attach the voltage detection line P to the bus bar 10 individually, thereby making it possible to improve assembly performance. Further, since at least part of the voltage detection line P including the connection region R with the bus bar 10 is covered with thermo plastic resin, it is possible to restrain corrosion, due to dew condensation or the like, of the voltage detection line P including the connection region R with the bus bar 10. Further, by covering the connection region R with the thermo plastic resin, it is possible to improve connection strength between the bus bar 10 and the voltage detection line P.

Further, since the connection unit 1 (the rail member 30) of the present embodiment is configured such that each of the bus bar units 20 is movable independently along the rail member 30, it is possible to simplify a structure to absorb variations in the plurality of single cells 3 which variations are caused due to the tolerance of the single cells 3. Like the bus bar module of JP 2012-243608 A, for example, in a complicated structure, in which bus bar accommodation portions adjacent to each other are formed integrally via a tolerance absorption portion, it is difficult to elongate the bus bar module along a longitudinal direction of the battery pack 2. In contrast, the connection unit 1 of the present embodiment has a simplified structure in which a plurality of bus bar units 20 is placed in the engagement rail 40 such that distances between the bus bar units 20 can be adjusted independently. Accordingly, it is possible to elongate the rail member 30 along the longitudinal direction of the battery pack 2.

Further, the rail member 30 can be formed by extrusion integrally with each of the engagement, rails 40, the detection line placement portions 50, the outlet portion 60, and the mounting portions 70 for the temperature sensors T, so as to fit a longitudinal length of the battery pack 2. This accordingly makes it possible to reduce a manufacturing cost. The rail member 30 can be made of a resin material.

Further, the openings 10*a*, 10*b* through which the positive terminal 5 and the negative terminal 6 of the single cells 3 are passed can be formed in an elongated-hole shape in the X-direction. This is to absorb tolerance of the single cells 3 adjacent to each other, relative to a fixed distance between the openings 10*a*, 10*b* in one bus bar 10. However, even in a case where the openings 10*a*, 10*b* are formed in an elongated-hole shape, if the distance between the bus bar units 20 adjacent to each other cannot be adjusted independently, it is difficult to attach the bus bar units 20 (the bus bars 10) that absorb variations in the longitudinal direction of the battery pack 2, as described above.

That is, if the distance between the bus bar units 20 adjacent to each other cannot be adjusted independently, it is necessary to form the openings 10*a*, 10*b* of the bus bar 10 in an elongated-hole shape and to enlarge the elongated holes in the X-direction so as to absorb variations in the longitudinal direction of the battery pack 2, which results in that the length of the bus bar 10 gets longer. Because of this, the number of bus bars 10 (bus bar units 20) aligned in the X-direction is reduced. Accordingly, the number of bus bars 10 may become insufficient relative to the number of single cells 3 constituting the battery pack 2, or the battery pack 2 may be elongated in the X-direction according to distances between the bus bars 10. In contrast, in the connection unit 1 of the present embodiment, the tolerance in the single cells 3 is absorbed by independent relative movement of the bus bar units 20 along the rail member 30. Accordingly, the openings 10*a*, 10*b* in one bus bar 10 can be formed as a relatively short elongated hole in the X-direction to such an extent that only tolerance in adjacent single cells 3 can be absorbed. As a result, it is possible to place many bus bar units 20 (bus bars 10) relative to a given length of the battery pack 2. This results in that the bus bar unit 20 can be downsized and many bus bar units 20 can be incorporated into the connection unit 1, so that the bus bars 10 can be assembled to the battery pack 2 including more single cells 3. Further, the bus bar units 20 of the present embodiment are configured such that respective distances between the bus bar units 20 adjacent to each other can be adjusted independently. Accordingly, even if the openings 10*a*, 10*b* of the bus bars 10 are not formed in an elongated-hole shape, entire assembly tolerance in the plurality of single cells 3 aligned in the X-direction can be absorbed (permitted).

Figure 7:
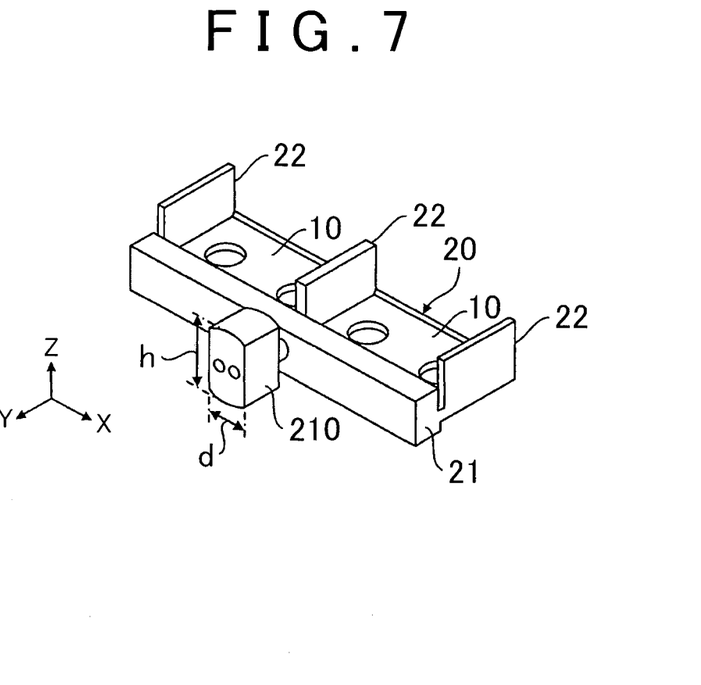
FIG. 7 is a view illustrating a modification of the bus bar unit in Embodiment 1.
Figure 8:
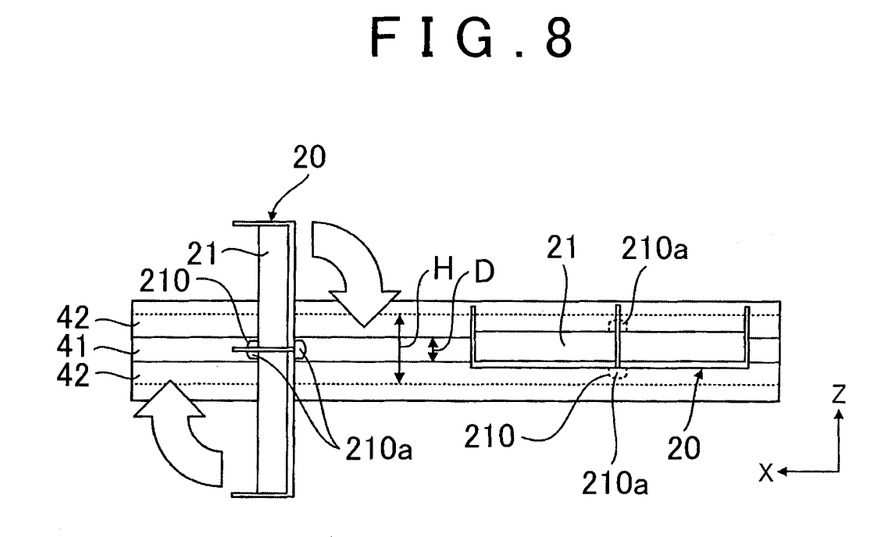
FIG. 8 is a view to describe a configuration in which the modification of FIG. 7 is placed in the connection unit in Embodiment 1.

FIGS. 7 and 8 are views each illustrating a modification of the bus bar unit 20. In the present modification, a bus bar unit 20 is configured so as to be insertable into an opening of a slit 41 of an engagement rail 40 from a direction generally perpendicular to the opening.

As illustrated in FIGS. 7 and 8, the bus bar unit 20 includes a second engagement portion 210. The second engagement portion 210 is provided so as, to project from an engagement portion 21 toward a side opposite to a base end portion 21*b* in the Y-direction. The second engagement portion 210 has a width d smaller than a width D of the slit 41 in the Y-direction, and has a height h in the Z-direction. The height h is smaller than a height H, in the Z-direction, of an inner surface of a wall portion 42 on which the slit 41 is formed.

As illustrated in FIG. 8, the bus bar unit 20 including the second engagement portion 210 can be attached to the engagement rail 40 in such a manner that the second engagement portion 210 is inserted from the opening of the slit 41 in a state where the bus bar unit 20 is rotated by about 90 degrees so that a direction where the slit 41 extends is generally parallel with the height h of the second engagement portion 210 in an X-Z plane.

After the second engagement portion 210 is inserted into a hollow internal portion of the engagement rail 40 from a direction generally perpendicular to the opening of the slit 41, the bus bar unit 20 is rotated by generally 90 degrees on the X-Z plane. At this time, the height h of the second engagement portion 210 is smaller than the height H of the internal surface of the wall portion 42 of the engagement rail 40. Accordingly, the second engagement portion 210 can rotate inside the hollow internal portion of the engagement rail 40, so that an end surface 210a of the second engagement portion 210 can make contact with the inner surface of the wall portion 42. In a state where a longitudinal direction of the bus bar unit 20 is generally in parallel with the slit 41, the second engagement portion 210 makes contact with the inner surface of the wall portion 42 of the engagement rail 40 in the Z-direction. This accordingly makes it possible to attach the bus bar unit 20 such that its movement in the Y-direction is prevented and its movement in the X-direction is allowed.

In the present modification, it is not necessary to insert the bus bar unit 20 from an X-direction end part of the engagement rail 40, so that the plurality of bus bar units 20 can be easily attached to the rail member 30 elongated in the X-direction from a given position.

Further, as illustrated in FIG. 7, a voltage detection line P extending from the bus bar 10 can be configured to be exposed from a Y-direction end surface of the second engagement portion 210, not from a Y-direction end surface of the engagement portion 21. With such a configuration, the bus bar unit 20 can be attached from the opening of the slit 41, and the voltage detection line P can be disposed in a detection line placement portion 50 through the opening of the slit 41.

Note that the above description deals with a configuration in which the engagement portion 21 of the bus bar unit 20 is inserted into the engagement rail 40, so that peripheries of the engagement portion 21 make contact with the hollow internal portion of the engagement rail 40, but the present embodiment is not limited to this. That is, any engagement configuration can be employed provided that the bus bar unit 20 is movable along the longitudinal direction of the battery pack 2 without being removed from the rail member 30. For example, the engagement portion 21 may be formed in a U-shape, and the engagement rail 40 may be formed to have a reversed U-shape that engages with the U-shape of the engagement portion 21. With such a configuration, the bus bar unit 20 can be moved in the longitudinal direction of the battery pack 2 in a state where the bus bar unit 20 is attached to the engagement rail 40 without removal of the bus bar unit 20 from the engagement rail 40.

The invention claimed is:

1. A connection unit configured to electrically connect a plurality of storage elements aligned in a predetermined direction, the connection unit comprising:
   an elongated rail member extending in the predetermined direction; and
   a plurality of bus bar units each including an engagement portion configured to engage with the rail member so as to slide along the rail member in the predetermined direction, and a bus bar fixed to electrode terminals of the storage elements adjacent to each other in the predetermined direction and connected to the engagement portion, wherein:
   the engagement portion is provided so as to extend to a side of the bus bar;
   the rail member includes an engagement rail configured to engage with the engagement portion;
   the bus bar is disposed to project outside the engagement rail in a state where the bus bar units are attached to the rail member;
   the plurality of bus bar units engages with the rail member so as to be aligned in the predetermined direction; and
   the bus bar units adjacent to each other are provided so as to be movable independently along the predetermined direction.

2. The connection unit according to claim 1, wherein:
   the rail member includes:
      a slit allowing the engagement portion to move along the predetermined direction;
      an outlet portion provided at a position corresponding to an exhaust valve configured to exhaust gas generated in the storage element to its outside, the outlet portion extending in the predetermined direction so as to form a gas discharge path provided generally in parallel with the engagement rail; and
      a mounting portion extending along the outlet portion and configured such that a temperature sensor configured to detect a temperature of the storage elements is provided therein, and
   the engagement rail, the outlet portion, and the mounting portion are formed integrally with each other so as to be aligned in a direction generally perpendicular to the predetermined direction.

3. The connection unit according to claim 1, wherein:
   each of the bus bar units further includes a voltage detection line connected to the bus bar and configured to detect a voltage of the storage element;
   the rail member includes a detection line placement portion extending along a direction where the plurality of bus bar units is aligned; and
   the voltage detection line extending from the bus bar unit placed in the rail member via the engagement portion is extended in the detection line placement portion generally in parallel with the predetermined direction.

4. The connection unit according to claim 3, wherein:
   the engagement portion is made of thermoplastic resin;
   at least part of the voltage detection line including a connection region with the bus bar is covered with the thermoplastic resin; and
   the bus bar unit is configured such that the bus bar and the voltage detection line are formed integrally with each other.

5. The connection unit according to claim 1, wherein:
   the bus bar includes a plurality of openings configured to receive terminals of the plurality of storage elements, the plurality of openings being provided on a portion of the bus bar that projects outside the engagement rail.

* * * * *